3,203,217
FORMING OF MATERIALS BY EXTRUSION
Derek Green, Lytham St. Annes, England, assignor to United Kingdom Atomic Energy Authority, London, England
Filed May 31, 1963, Ser. No. 284,524
Claims priority, application Great Britain, June 22, 1962, 24,217/62
1 Claim. (Cl. 72—265)

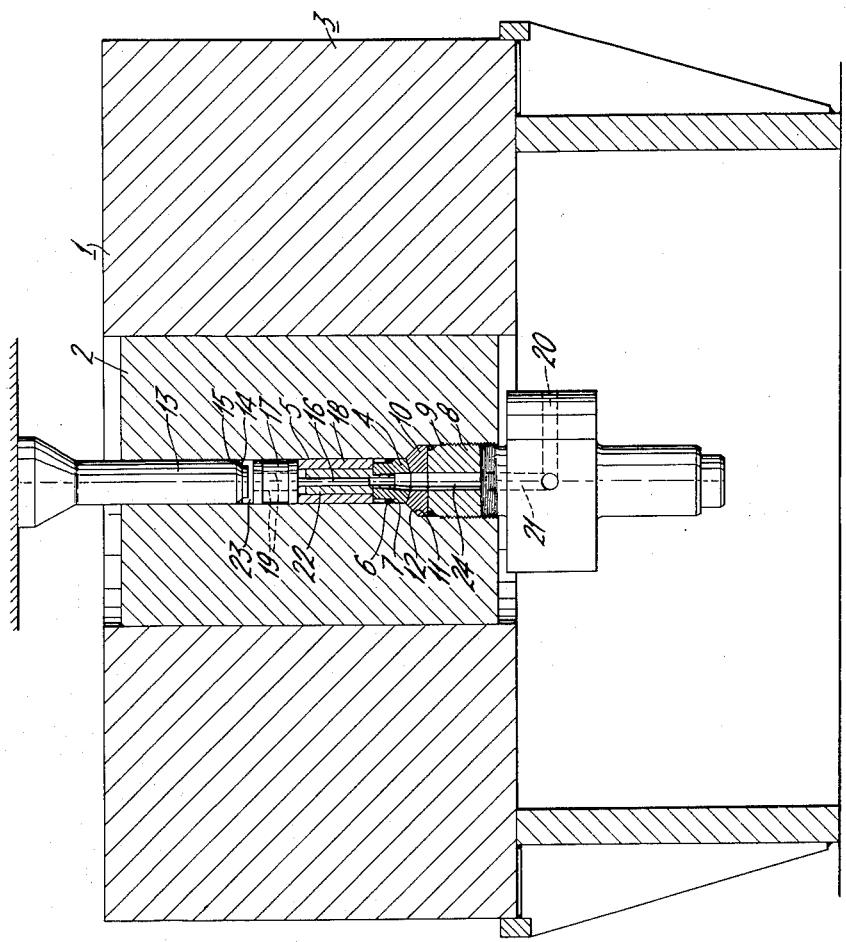

This invention relates to the forming of materials by extrusion.

It is customary practice to form tubes by extrusion of the material from a container through a die about a mandrel which defines the bore of the tube. The material may be extruded from the container by a ram movable along the container and the mandrel may be formed as a coaxial extension of the ram so that as the ram moves along the container in extruding the material the mandrel moves concentrically through the die. This arrangement has several disadvantages in that the mandrel is liable to fracture by bending under non-uniform forces exerted on the mandrel by the material being extruded or by compressional forces exerted on the mandrel by the material being extruded. Even if fracture of the mandrel does not occur bending of the mandrel, by non-uniform forces exerted on the mandrel at the die by the material being extruded, may result in the mandrel passing off-centre through the die thus producing a tube with a non-concentric bore.

In another form of equipment a stationary mandrel is employed. The mandrel is located along the centre line of the main extrusion ram and is held stationary relative to the die and container by hydraulic means as the main extrusion ram is advanced along the container to extrude the material. The disadvantage of this arrangement lies in its complicated nature as a special press is required.

According to the invention apparatus for the extrusion of a material to form a tube comprises a container for the material to be extruded, means for pressurising a liquid in the bore of the container about the material to be extruded, an extrusion die located at the mouth of the bore of the extrusion container and a mandrel rigidly located in the bore of the container along the line of the longitudinal axis of the bore of the die.

The means for pressurising liquid in the bore of the container about the material to be extruded may comprise a ram movable along the bore of the container. The mandrel may have an enlarged head fitting in the bore of the container, the mandrel being positioned longitudinally in the container by a sleeve fitting in the bore of the container and extending between the head of the mandrel and the face of the die internal to the bore of the container. In this arrangement passageways are provided through the head of the mandrel to allow the pressure in the liquid to be transmitted from one side of the head of the mandrel to the other i.e. from the side of the mandrel head facing the ram to the side of the mandrel head facing the die.

One embodiment of the invention will now be described by way of example with reference to the single figure of the accompanying drawings, the figure being a longitudinal sectional elevation.

In the drawing there is shown a container 1 comprising concentric inner and outer rings 2 and 3. The outer ring 3 is shrunk fit on the inner ring 2 to advantageously prestress the inner ring 2 against internal pressure. The container 1 has the following dimensions:

External diameter of outer ring 3, 24 inches
Bore diameter of outer ring 3, 8 inches
External diameter of inner ring 2, 8 inches
Bore diameter of inner ring 2, 1.25 inches An extrusion die 4 is located at the lower end of the bore 5 of the container 1. The die 4 is sealed in the container bore 5 by a copper ring 6 bearing against the inside of the container bore 5 and against a conical face 7 on the die 4. The die 4 is held in the container bore 5 by a tubular plug 8 which is screwed into an enlarged end portion 9 of the container bore 5. The plug 8 acts through an intermediate support stool 10 which has a conical sealing face 11 mating with a complementary sealing face 12 in the enlarged end portion 9 of the container bore 5. A cylindrical ram 13 is a close sliding fit in the upper end of the container bore 5 and a sealing ring 14 seals between the container bore 5 and a conical face 15 at the lower end of the ram 13. A mandrel 16 is located rigidly in the container bore 5 along the line of the longitudinal axis of the bore of the die 4. The mandrel 16 has an enlarged support head 17 which is a sliding fit in the container bore 5. The mandrel 16 is supported in the container bore 5 by a sleeve 18 which extends between the head 17 of the mandrel 16 and the internal end face of the die 4. Longitudinal passageways 19 are provided through the head 17 of the mandrel 16. A transverse drilling 20 provides connection with the bore 21 of the plug 8 below the die 4, thus allowing pressurization of hydraulic fluid on the outlet side of the die i.e. by means of an external pump connected with the drilling 20.

In use of the arrangement removal of the ram 13 and the mandrel 16 is effected and a tubular extrusion billet 22 is dropped into the bore 5 of the container 1 and is located inside the sleeve 18. The mandrel 16 is placed in position in the bore 5 of the container 1 and hydraulic fluid 23 is poured into the bore 5 of the container 1 to envelope the billet 22 and the mandrel 16. The bore 5 of the container 1 is filled to above the level of the head 17 of the container 1 and the ram 13 is placed in position in the container bore 5. Hydraulic fluid 24 in the bore 21 of the plug 8 is now pressurised through the transverse drilling 20 by the external pump. The ram 13 is now forced down the bore 5 of the container 1 by means of the ram of a conventional hydraulic press thus raising the hydraulic fluid 23 in the container bore 5 to a pressure higher than that existing in bore 21. The pressure in the hydraulic fluid above the head 17 of the mandrel 16 is transmitted through the longitudinal passageways 19 in the head 17 of the mandrel 16 to the hydraulic fluid 23 surrounding the billet 22 and the billet 22 is thus extruded through the die 4 about the stationary mandrel 16 to form a tube.

The arrangement allows the use of a stationary mandrel in extrusion using a simple hydraulic press, the mandrel 16 being cheap to manufacture and hence cheap to replace if broken. The mandrel 16 is rigidly and accurately supported relative to the die and hence the production of a tube with an accurately concentric bore is enabled.

The position of the mandrel 16 can be adjusted relative to the die by altering the length of the support sleeve 18.

As the billet is completely (apart from its bottom face) surrounded by the hydraulic fluid 23 thus friction between the billet, the container bore 5 and the mandrel 16 is substantially eliminated.

I claim:

Apparatus for the extrusion of material to form a tube, comprising: a container having a cylindrical bore, an extrusion die located at one end of the bore in the container, a mandrel rigidly located in the bore of the container in line with the longitudinal axis of the extrusion die, said mandrel having an enlarged head fitting in the bore of the container, means in the bore of the container positioning the mandrel longitudinally in the bore of the container and spacing the head of the mandrel from the extrusion die, a space for a tubular extrusion billet being defined inside the bore of the container around the mandrel and between the head of the mandrel and the extrusion die, and means for pressurising liquid in the bore of the container on the side of the mandrel head remote from the die, longitudinal passageways being provided through the head of the mandrel to allow pressure in liquid on the side of the mandrel head remote from the die to be transmitted to liquid on the side of the mandrel head facing the die.

References Cited by the Examiner

UNITED STATES PATENTS

| Re. 82 | 3/46 | Hanson | 207—5 |
| 2,558,035 | 6/51 | Bridgman | 207—10.11 |
| 2,964,178 | 12/60 | Goldsmith et al. | 207—5 |

FOREIGN PATENTS

| 476,793 | 9/51 | Canada. |
| 796,634 | 6/58 | Great Britain. |

CHARLES W. LANHAM, *Primary Examiner.*

MICHAEL V. BRINDISI, *Examiner.*